(12) United States Patent
Mazur

(10) Patent No.: US 9,463,585 B2
(45) Date of Patent: Oct. 11, 2016

(54) TRIM COMPONENT AND METHOD FOR MANUFACTURING A TRIM COMPONENT

(71) Applicant: GM GLOBAL TECHNOLOGY OPERATIONS LLC, Detroit, MI (US)

(72) Inventor: Lorin A. Mazur, Shelby Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 24 days.

(21) Appl. No.: 14/623,815

(22) Filed: Feb. 17, 2015

(65) Prior Publication Data

US 2016/0121522 A1    May 5, 2016

Related U.S. Application Data

(60) Provisional application No. 62/073,469, filed on Oct. 31, 2014.

(51) Int. Cl.

| | |
|---|---|
| B29C 44/12 | (2006.01) |
| B29C 41/08 | (2006.01) |
| B32B 3/04 | (2006.01) |
| B32B 3/28 | (2006.01) |
| B32B 3/26 | (2006.01) |
| B32B 5/20 | (2006.01) |
| B32B 7/04 | (2006.01) |
| B29K 105/04 | (2006.01) |
| B29L 31/30 | (2006.01) |
| B29L 9/00 | (2006.01) |

(52) U.S. Cl.
CPC ............... *B29C 44/12* (2013.01); *B29C 41/08* (2013.01); *B32B 3/04* (2013.01); *B32B 3/263* (2013.01); *B32B 3/28* (2013.01); *B32B 5/20* (2013.01); *B32B 7/04* (2013.01); *B29K 2105/04* (2013.01); *B29L 2009/00* (2013.01); *B29L 2031/3041* (2013.01); *B32B 2250/04* (2013.01); *B32B 2266/02* (2013.01); *B32B 2605/08* (2013.01)

(58) Field of Classification Search
CPC ....... B29C 41/08; B29C 41/22; B29C 44/00; B29C 44/12; B29C 44/1228; B29C 44/1257; Y10T 428/24215; Y10T 428/24231–428/24248; Y10T 428/24488; Y10T 428/24504
USPC ........................................................ 264/46.4
See application file for complete search history.

(56) References Cited

U.S. PATENT DOCUMENTS

| | | | | |
|---|---|---|---|---|
| 4,385,090 A | * | 5/1983 | Sims ....................... | B29C 63/04 156/211 |
| 7,416,626 B2 | * | 8/2008 | Dooley ................... | B29C 53/36 156/202 |

* cited by examiner

*Primary Examiner* — Alexander Thomas
(74) *Attorney, Agent, or Firm* — Quinn Law Group, PLLC

(57) ABSTRACT

A method for manufacturing a trim component includes the following steps: (a) forming an outer skin layer in the shape of a trim component; (b) applying an inner skin layer on the outer skin layer; (c) spraying a foam layer on the inner skin layer; (d) disposing a substrate on the foam layer; and (e) wrapping portions of the inner skin layer, the outer skin layer, and the foam layer around at least one edge of the substrate.

8 Claims, 3 Drawing Sheets

TRIM COMPONENT AND METHOD FOR MANUFACTURING A TRIM COMPONENT

CROSS-REFERENCE TO RELATED APPLICATION

This application claims the benefit of U.S. Provisional Application No. 62/073,469, filed Oct. 31, 2014, which is hereby incorporated by reference in its entirety.

TECHNICAL FIELD

The present disclosure relates to a trim component and a method for manufacturing a trim component.

BACKGROUND

Vehicles include a variety of interior components, such as trim components. Interior trim components may be attached to or formed integrally with various surfaces of a vehicle interior including, for example, a door panel, an instrument panel, a dashboard, and/or the like. Certain interior trim components may be soft and/or otherwise have some degree of compressibility. Conventional soft interior trim components may be constructed using a separate sheet foam layer and/or adhesives to bind the separate foam layer to a substrate material and/or an aesthetically pleasing interior surface (e.g., using a foam-in-place or a press laminate process).

SUMMARY

The present disclosure describes a method for manufacturing a trim component. In an embodiment, the method includes the following steps: (a) forming an outer skin layer in the shape of a trim component such that the outer skin layer includes a main outer skin portion and an outer skin extension extending from the main skin portion; (b) applying an inner skin layer on the outer skin layer such that a main inner skin portion of the inner skin layer is disposed on the main outer skin surface and an inner skin extension of the inner skin layer is disposed on the outer skin extension; (c) spraying a foam layer on the inner skin layer so that a main foam portion of the foam layer is disposed on the main inner skin portion and a foam extension is disposed on the inner skin extension; (d) disposing a substrate on the foam layer such that the substrate is disposed on the main foam portion, and the outer skin extension, the inner skin extension, and the foam extension are disposed beyond at least one edge of the substrate; and (e) wrapping the outer skin extension, the inner skin extension, and the foam extension around at least one edge of the substrate. In this embodiment, the foam layer is sprayed so that the foam extension is thinner than the main foam portion.

The present disclosure also describes a trim component. In an embodiment, the trim component includes a substrate having at least one edge and a foam layer disposed on the substrate. The foam layer includes a main foam portion and a foam extension extending from the main foam portion. The foam extension is thinner than the main foam portion. The trim component also includes an inner skin layer disposed on the foam layer. The inner skin layer includes a main inner skin portion and an inner skin extension extending from the main inner skin portion. The trim component also includes an outer skin layer disposed on the inner skin layer. The outer skin layer includes a main outer skin portion and an outer skin extension extending from the main outer skin portion. The foam extension, the inner skin extension, and the outer skin extension are wrapped around at least one edge of the substrate. The present disclosure also relates to vehicles including a trim component as described above.

The above features and advantages and other features and advantages of the present teachings are readily apparent from the following detailed description of the best modes for carrying out the teachings when taken in connection with the accompanying drawings.

DETAILED DESCRIPTION

Figure 1:
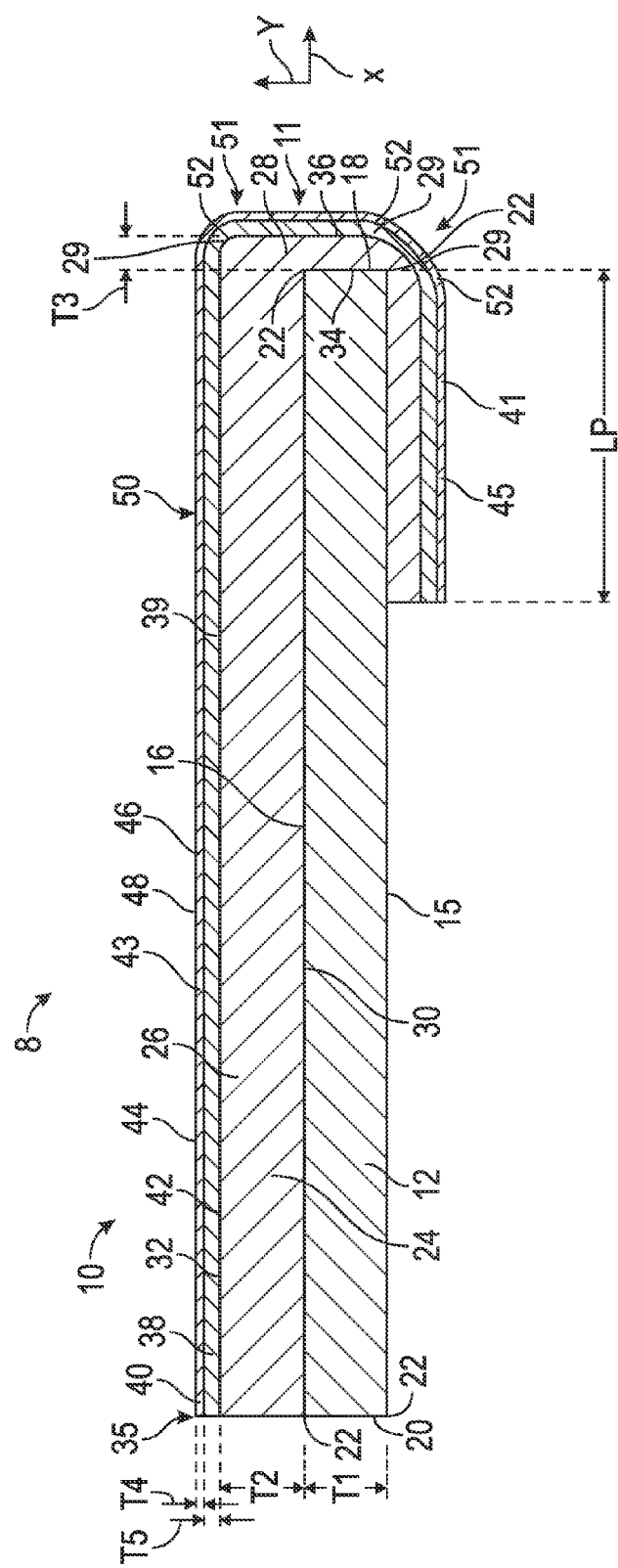
FIG. 1 is a side, sectional view of a trim component.

Referring to the drawings, wherein like reference numbers correspond to like or similar components throughout the several figures, FIG. 1 illustrates a trim component 10. The trim component 10 may be a soft component. As used herein, the "soft component" refers to a component that is soft to the human touch and/or otherwise has some degree of compressibility. The trim component 10 may be a vehicle interior component and may therefore be included in the interior of a vehicle 8, such as a car. As non-limiting examples, the trim component 10 may be a door trim component, a seat trim component, an instrument panel trim component, a dashboard trim component, a sidewall trim component, a headliner trim component, an armrest trim component, a cabin environment control console trim component, and/or the like. In addition, the trim component 10 may also be used, for example, in indoor furniture, outdoor furniture, and/or the like.

In the depicted embodiment, the trim component 10 includes a substrate 12 and a foam layer 24 directly bonded to the substrate 12. The substrate 12 is wholly or partly made of a substantially rigid material, such as a rigid polymeric material, and may be formed using a variety of suitable processes including, without limitation, injection molding, compression molding, vacuum compression molding, and/or the like. For example, the substrate 12 may be wholly or partly made of a natural fiber material, a plastic material, and/or the like. In some embodiments, the substrate 12 may be configured to be secured to one or more interior panel components of a vehicle interior using one or more discrete and/or integral fasteners, thereby securing the trim component 10 to the vehicle 8. However, it is contemplated that the substrate 12 may be configured to be coupled to other objects, such as furniture. The substrate 12 includes a first substrate surface 15 and a second substrate surface 16 opposite the first substrate surface 15, a first substrate side surface 18, and a second substrate side surface 20 opposite the first substrate side surface 18, thereby forming a substantially rectangular shape. However, the substrate 12 may have other suitable shapes. Irrespective of its shape, the substrate 12 includes at least one edge 22 defining the end of any of the surfaces mentioned above. In the depicted embodiment, the substrate 12 has at least four edges 22. For instance, one edge 22 defines the end of the first substrate surface 15 and the beginning of the first substrate side surface 18, and another edge 22 defines the end of the first substrate side surface 18 and the beginning of the second substrate surface 16. The thickness T1 of the substrate 12 may be about 2.5 millimeters.

The foam layer 24 is bonded to the second substrate surface 16 without the use of binding adhesives (as described below) and is wholly or partly made of a polymeric foam. Therefore, the foam layer 24 provides a certain degree of compressibility to the trim component 10. For instance, the foam layer 24 may be entirely or partly made of a structural foam, such as urethane foam. Alternatively, as non-limiting examples, the foam layer 24 may be wholly or partly made of polyurethane, thermoplastic materials, EVA, semi-rigid expanded foam materials, polyethylene, bio-based materials, PVC, a combination thereof, or any other suitable material. Regardless of the specific material employed, the material forming the substrate 12 is harder than the material forming the foam layer 24 so that the substrate 12 can support the foam layer 24.

In the depicted embodiment, the foam layer 24 includes a main foam portion 26 and a foam extension 28 directly connected to the main foam portion 26. The main foam portion 26 is substantially flat and planar in order to facilitate direct bonding to the second substrate surface 16. The foam extension 28 is wrapped around two edges 22 of the substrate 12 and, in the depicted embodiment, is directly bonded to the first substrate side surface 18 and the first substrate surface 15. At least part of the foam extension 28 is directly bonded to the first substrate surface 15 along a portion of the length (i.e., the length portion LP) of the substrate 12. This length portion LP may be about 10 millimeters.

The thickness T3 of the foam extension 28 is less than the thickness T2 of the main foam portion 26 in order to minimize draft in the bent part 11 of the trim component 10. As used herein, the term "draft" means the amount of taper for molded or cast parts perpendicular to a parting line. For instance, the thickness T3 of the foam extension 28 may be about 1 millimeter, and the thickness T2 of the main foam portion may be about 2.5 millimeters. Thus, the foam extension 28 is thinner than the main foam portion 26. The thickness T1 of the substrate 12 may be substantially the same as the thickness T2 of the main foam portion 26.

The main foam portion 26 defines a first main foam surface 30 and a second main foam surface 32 opposite the first main foam surface 30. The thickness T2 of the main foam portion 26 is the distance from the first main foam surface 30 to the second main foam surface 32 along a first or vertical direction Y. The foam extension 28 defines a first foam extension surface 34 and a second foam extension surface 36 opposite the first foam extension surface 34. The thickness T3 of the foam extension 28 is the distance from the first foam extension surface 34 to the second foam extension surface 36 along a second or horizontal direction X, which is perpendicular to the first direction Y.

The trim component 10 additionally includes a skin 35 directly bonded to the foam layer 24. The skin 35 may include more than one layer. For instance, in the depicted embodiment, the skin 35 includes a first or inner skin layer 38 and a second or outer skin layer 40. The inner skin layer 38 may be a structural coat for structurally supporting the outer skin layer 40, and the outer skin layer 40 may be a color coat for imparting color (e.g., red) to the trim component 10. It is contemplated that another layer, such as a protective layer, may be outside the outer skin layer 40. The inner skin layer 38 and the outer skin layer 40 may be wholly or partly made of urethane, such as urethane foam. Alternatively, inner skin layer 38 and the outer skin layer 40 may be wholly or partly made of polyurethane, thermoplastic materials, EVA, semi-rigid expanded foam materials, polyethylene, bio-based materials, PVC, a combination thereof, or any other suitable material. The inner skin layer 38 and the outer skin layer 40 may be made of different material (e.g., different urethane materials) having different properties. (e.g., hardness, thickness, color, composition, etc.). In some embodiments, the inner skin layer 38 and the outer skin layer 40 are made of the same material (e.g., the same urethane material). Irrespective of the specific material used, the material forming the substrate 12 is harder than the materials forming the inner skin layer 38 and the outer skin layer 40, thereby enabling the substrate 12 to support the inner skin layer 38 and the outer skin layer 40.

The inner skin layer 38 is directly bonded to the second main foam surface 32 and has a first inner surface 42 and a second inner surface 44 opposite the first inner surface 42. The foam layer 24 may be directly bonded to the first inner surface 42 of the inner skin layer 38 without bonding adhesives or the like. The inner skin layer 38 includes a main inner skin portion 39 and an inner skin extension 41 extending from the main inner skin portion 39. The main inner skin portion 39 is disposed on the first main foam surface 30 of the main foam portion 26. The inner skin extension 41 is wrapped around at least one edge 22 of the substrate 12 and is disposed over the foam extension 28. Further, the inner skin layer 38 may be wholly or partly made of a urethane material that may be the same or a different material than the material forming the outer skin layer 40. In certain embodiments, the inner skin layer 38 may have a thickness T4 of about 0.4 millimeters to 0.6 millimeters. For example, in certain embodiments, the inner skin layer 38 may have a thickness T4 of about 0.5 millimeters. The thickness T4 is the distance from the first inner surface 42 to the second inner surface 44 along the first direction Y.

The outer skin layer 40 is directly bonded to the second inner surface 44 and defines a first outer layer surface 46 and a second outer layer surface 48 opposite the first outer layer surface 46. In the depicted embodiment, the outer skin layer 40 includes a main outer skin portion 43 and an outer skin extension 45 extending from the main outer skin portion 43. The main outer skin portion 43 is disposed on the main inner skin portion 39, and the outer skin extension 45 is wrapped around at least one edge 22 of the substrate 12 and is disposed over the inner skin extension 41. As discussed above, the outer skin layer 40 may be a color coat made of a urethane material having a certain color and/or pigmentation and/or a combination of a plurality of colors and/or pigmentations. Further, the outer skin layer 40 may include a material having properties allowing for increased wear. In some embodiments, the outer skin layer 40 may have a thickness T5 of about 0.1 millimeters to 0.3 millimeters. For example, in certain embodiments, the thickness T5 of the outer skin layer 40 may be about 0.2 millimeters. The thickness T5 of the outer skin layer 40 is the distance from the first outer layer surface 46 to the second outer layer surface 48 along the first direction Y.

The skin 35 and the foam layer 24 collectively form the substrate cover 50, which covers at least the entire first main foam surface 30 and wraps around at least one edge 22 of the substrate 12. Because substrate cover 50 is partially wrapped around the substrate 12, the substrate cover 50 includes at least one cover bend line 52 around a bend portion 51 covering an edge 22. As used herein, the term "bend line" means a straight line on the surface of an object (e.g., the substrate cover 50), on either side of the bend, that defines the start of the bend. In the depicted embodiment, the substrate cover 50 has a plurality of cover bend lines 52 and includes a main cover portion 53 and a plurality of cover extensions 55. The cover extensions 55 are wrapped around the substrate 12 and may have corner cuts 57 to facilitate wrapping the cover extensions 55 around the substrate 12.

As discussed above, the foam extension 28 is wrapped around at least one edge 22 of the substrate 12. Thus, the foam extension 28 has at least one foam bend line 29. Each foam bend line 29 is disposed over an edge 22 of the substrate 12. The foam extension 28 is thinner at (or near) the foam bend line 29 than along the rest of the foam extension 28 to facilitate wrapping the foam extension 28 around the edges 22 of the substrate 12. (See also FIG. 4).

As discussed above, the inner skin extension 41 is wrapped around at least one edge 22 of the substrate 12. Consequently, the inner skin extension 41 has at least one inner skin bend line 47. Each inner skin bend line 47 is disposed over an edge 22 of the substrate 12. The inner skin extension 41 is thinner at (or near) the inner skin bend line 47 than along the rest of the inner skin extension 41 in order to facilitate wrapping the inner skin extension 41 around the edges 22 of the substrate 12. (See also FIG. 4).

With reference to FIGS. 1-4, a method 100 for manufacturing the trim component 10 begins with step 102, which entails forming the outer skin layer 40 in the shape of a trim component 10 such that the outer skin layer 40 includes the main outer skin portion 43 and the outer skin extension 45. To do so, the outer skin layer 40 may be applied on an inner tool surface 62 of a tool 60, such as a mold. The tool 60 defines the shape of the trim component 10 and may create a texture on the second outer layer surface 48 of the outer skin layer 40. The inner tool surface 62 defines a tool cavity 64 that is shape in the form of the trim component 10. Thus, the outer skin layer 40 is applied on the inner tool surface 62 of the tool 60 to form the shape of the trim component 10. In one example, a sprayer 66 can spray the outer skin layer 40 into the tool cavity 64 of the tool 60. The sprayer 66 may be controlled by a robotic arm. The amount and location of the sprayed outer skin layer 40 can be controlled by a processor. For instance, the sprayer 66 can spray the material forming the outer skin layer 40 (e.g., a urethane material) into the tool 60 so that the outer skin extension 45 is thinner than the main outer skin portion 43. After forming the outer skin layer 40, the method 100 proceeds to step 104.

Step 104 entails applying the inner skin layer 38 on the outer skin layer 40. Specifically, the inner skin layer 38 may be applied directly on the first outer layer surface 46 of the outer skin layer 40. To do so, the sprayer 66 may spray the material forming the inner skin layer 38 (e.g., a urethane material) into the tool cavity 64 so that the inner skin layer 38 is applied on the outer skin layer 40. The amount and location of the sprayed inner skin layer 38 can be controlled by a processor. For example, the sprayer 66 can spray the material forming the inner skin layer 38 on the outer skin layer 40 such that the main inner skin portion 39 of the inner skin layer 38 is disposed on the main outer skin portion 43 and the inner skin extension 41 of the inner skin layer 38 is disposed on the outer skin extension 45. The sprayer 66 also applies the inner skin layer 38 so that the inner skin extension 41 is thinner at (or near) the inner skin bend line 47 than along the rest of the inner skin extension 41. Then, the method 100 proceeds to step 106.

Step 106 entails applying the foam layer 24 on the inner skin layer 38 so that the main foam portion 26 of the foam layer 24 is disposed on the main inner skin portion 39 and the foam extension 28 is disposed on the inner skin extension 41. The foam layer 24 may be sprayed directly on the first inner surface 42 of the inner skin layer 38 using the sprayer 66. In other words, the sprayer 66 may spray the material forming the foam layer 24 (e.g., a urethane material) into the tool cavity 64 so that the foam layer 24 is applied on the inner skin layer 38. The amount and location of the sprayed foam layer 24 can be controlled by a processor. For example, the sprayer 66 can spray the material forming the foam layer 24 on the inner skin layer 38 such that the foam extension 28 is thinner at (or near) the foam bend line 29 than along the rest of the foam extension 28.

In steps 102, 104, and 106, the inner skin layer 38, the outer skin layer 40, and the foam layer 24 (i.e., the substrate cover 50) may be applied into the tool cavity 64 of the tool 60 such that the shape and size of the main cover portion 53 (i.e., the main inner skin portion 39, main outer skin portion 43, and main foam portion 26) match the shape and size of at least one surface of the trim component 10. As discussed above, in steps 102, 104, and 106, the inner skin layer 38, the outer skin layer 40, and the foam layer 24 (i.e., the substrate cover 50) may be applied into the tool cavity 64 of the tool 60 such that the cover extensions 55 (i.e., the inner skin extension 41, outer skin extension 45, and the foam extension 28) are thinner at (or near) the cover bend lines 52 than along the rest of the cover extension 55 in order to minimize draft when the trim component 10 is removed from the tool 60. Also in steps 102, 104, and 106, the inner skin layer 38, the outer skin layer 40, and the foam layer 24 (i.e., the substrate cover 50) may be applied into the tool cavity 64 of the tool 60 so as to create corner cuts 57 for facilitating wrapping the cover extensions 55 around the substrate 12. As a consequence, no cutting or trimming operation is necessary to create the corner cuts 57. After steps 102, 104, and 106, the method 100 continues to step 108.

Figure 3:
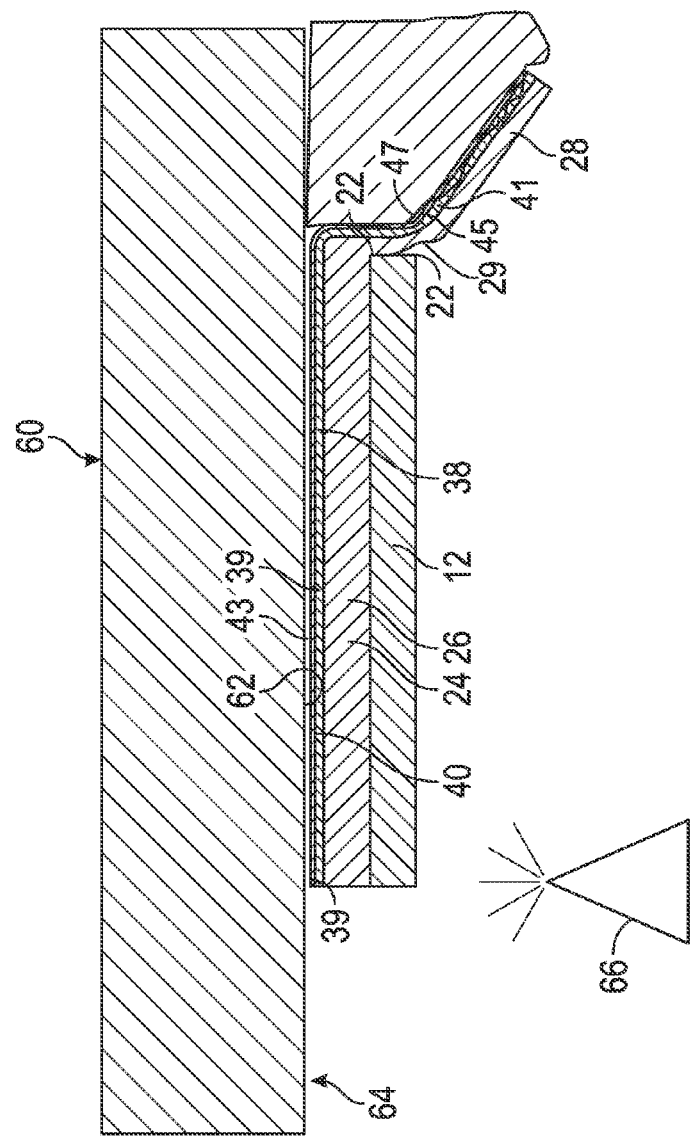
FIG. 3 is a schematic, sectional side view of a partially finished trim component disposed at least partly inside a tool.
Figure 2:
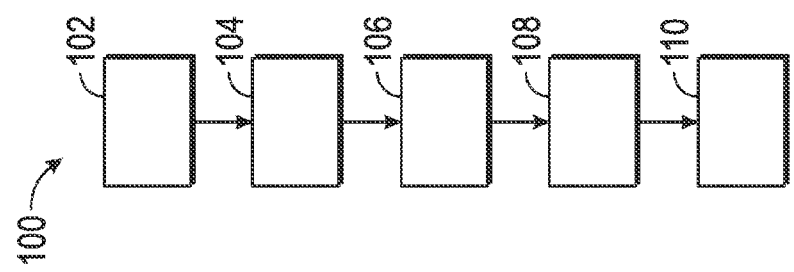
FIG. 2 is a flowchart of a method for manufacturing a trim component.
Figure 4:
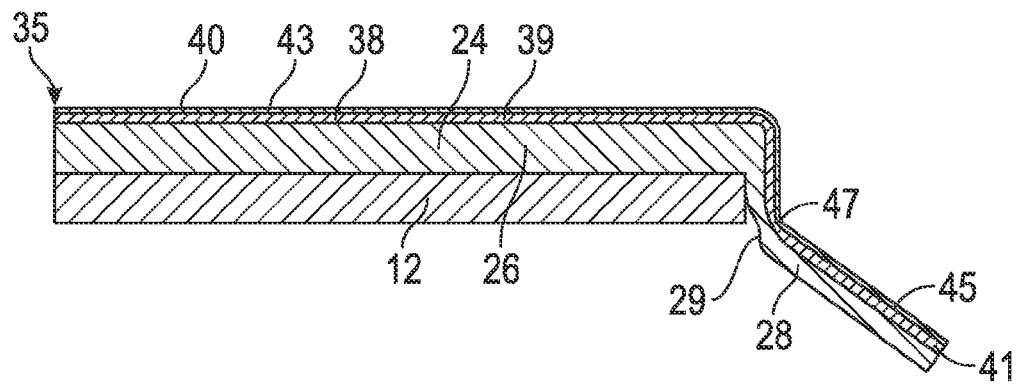
FIG. 4 is a schematic, sectional side view of a partially finished trim component removed from the tool.
Figure 5:
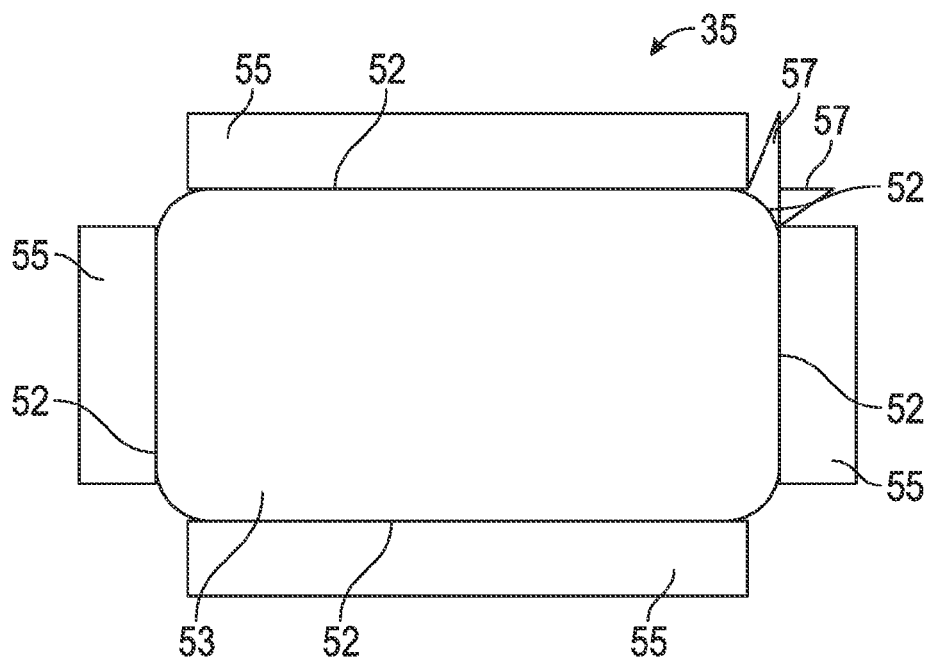
FIG. 5 is a schematic, top view of a substrate cover of the trim component shown in FIG. 1.

Step 108 entails disposing the substrate 12 on the foam layer 24 such that the substrate 12 is disposed on the main foam portion 26, and the outer skin extension 45, the inner skin extension 41, and the foam extension 28 are disposed beyond at least one of the edges 22 of the substrate 12. At this juncture, the main foam portion 26 of the foam layer 24 may be bonded to the substrate 12 without the use of bonding adhesives because the foam layer 26 has not cured yet. In other words, the substrate 12 may be disposed on the main foam portion 26 while the foam layer 24 remains tacky, thereby reducing or eliminating the use of bonding adhesives between the foam layer 24 and the substrate 12. The skin 35 (i.e., the outer skin layer 40 and inner skin layer 38) and the foam layer 24 may be bonded to the substrate 12 before removal from the tool 60 (as shown in FIG. 3) or after removal from the tool 60 as shown in FIG. 4. In some embodiments, the foam layer 24 may be bonded to the substrate 12 using a mechanical compression process. Further, heat may be applied to the foam layer 24 and/or the substrate 12 before and/or during a mechanical bonding process.

Step 110 entails wrapping the inner skin extension 41, outer skin extension 45, and the foam extension 28 around at least one edge 22 of the substrate 12 until the foam layer 24 is bonded to the first substrate surface 15 of the substrate 12. At this juncture, the foam extension 28 of the foam layer 24 may be bonded to the substrate 12 without the use of bonding adhesives because the foam layer 26 has not cured yet. In other words, the substrate 12 may be bonded to the foam extension 28 while the foam layer 24 remains tacky, thereby reducing or eliminating the use of bonding adhesives between the foam layer 24 and the substrate 12. In the end, the foam layer 24 is partially between the substrate 12 and the inner skin layer 38, and the inner skin layer 38 is partially between the foam layer 24 and the outer skin layer 40.

While the best modes for carrying out the teachings have been described in detail, those familiar with the art to which this disclosure relates will recognize various alternative designs and embodiments for practicing the teachings within the scope of the appended claims.

The invention claimed is:

1. A method for manufacturing a trim component, comprising:
   forming an outer skin layer in the shape of the trim component such that the outer skin layer includes a main outer skin portion and an outer skin extension extending from the main skin portion;
   applying an inner skin layer on the outer skin layer such that a main inner skin portion of the inner skin layer is disposed on the main outer skin portion and an inner skin extension of the inner skin layer is disposed on the outer skin extension;
   spraying a foam layer on the inner skin layer so that a main foam portion of the foam layer is disposed on the main inner skin portion and a foam extension is disposed on the inner skin extension such that the foam extension is thinner than the main foam portion;
   disposing a substrate on the foam layer such that the substrate is disposed on the main foam portion, and the outer skin extension, the inner skin extension, and the foam extension are disposed beyond at least one edge of the substrate; and
   wrapping the outer skin extension, the inner skin extension, and the foam extension around the at least one edge of the substrate.

2. The method of claim 1, wherein the foam extension is wrapped around the at least one edge of the substrate so as to define a foam bend line over the at least one edge, and spraying the foam layer includes spraying the foam layer so that the foam extension is thinner at the foam bend line than in the rest of the foam extension.

3. The method of claim 1, wherein the inner skin extension is wrapped around the at least one edge of the substrate so as to define an inner skin bend line over the at least one edge, and applying the inner skin layer includes applying the inner skin layer so that the inner skin extension is thinner at the inner skin bend line than in the rest of the inner skin extension.

4. The method of claim 1, wherein forming the outer skin layer includes applying the outer skin layer into a tool.

5. The method of claim 4, wherein applying the outer skin layer into the tool includes spraying the outer skin layer into the tool.

6. The method of claim 5, wherein applying the inner skin layer includes spraying the inner skin layer on the outer skin layer.

7. The method of claim 1, wherein forming an outer skin layer includes forming the outer skin layer so that the outer skin extension includes corner cuts.

8. The method of claim 1, wherein the outer skin extension, the inner skin extension, and the foam extension are wrapped around the at least one edge of the substrate before the foam layer has cured.

\* \* \* \* \*